US005748253A

United States Patent [19]
Chatinsky et al.

[11] Patent Number: 5,748,253
[45] Date of Patent: May 5, 1998

[54] DIRECT KEYBOARD ACCESS TO VIDEO EDITING SOURCE MATERIAL

[75] Inventors: Mark Chatinsky, Los Angeles; Bruce Kuchta, Canyon Country, both of Calif.

[73] Assignee: ASC Audio Video Corporation, Burbank, Calif.

[21] Appl. No.: 542,046

[22] Filed: Oct. 12, 1995

[51] Int. Cl.$^6$ ............................................... H04N 5/222
[52] U.S. Cl. ........................................... 348/552; 348/722
[58] Field of Search ................................. 348/10, 552, 722, 348/734, 571, 553, 718; 340/825.52

[56] References Cited

U.S. PATENT DOCUMENTS 4,855,842  8/1989  Hayes et al. ........................ 348/552
5,001,473  3/1991  Ritter et al. ...................... 340/825.52
5,355,450  10/1994  Garmon et al. ........................ 348/722
5,451,998  9/1995  Hamrick ............................... 348/10

*Primary Examiner*—Victor R. Kostak
*Attorney, Agent, or Firm*—Blakely, Sokoloff, Taylor & Zafman

[57] ABSTRACT

A method and apparatus for quickly accessing and technically organizing nonlinear digital video clips for purposes of editing, processing or playback using directly-mapped keyboard assignments. Video clips are directly mapped to individual keys of a conventional QWERTY keyboard. A selected video clip is accessed and brought into the "source" side of the editing system via a single keystroke.

4 Claims, 3 Drawing Sheets

DIRECT KEYBOARD ACCESS TO VIDEO EDITING SOURCE MATERIAL

BACKGROUND OF THE INVENTION

1. Field of the Invention

The present invention relates to the field of video editing and especially to editing digitally stored video. It relates to a method of accomplishing editing using a QWERTY keyboard in a way that significant improves the speed of execution by an editor.

2. Background of the Invention

The process of editing video has been maturing since the 1960's. Systems that employ QWERTY keyboards for most editing functions have been common since the 1970's. Non-proprietary industry conventions have developed which allow editors to work on different systems without extensive retraining. Consequently, professional video editors have become extremely proficient at performing editing tasks by operating the keyboard while maintaining visual attention on the video source and edited material.

Modern video editing systems now employ digital storage of compressed video data. Such systems allow random access to a large number of video segments or "clips". Because video editors are now freed from the linear constraints of tape-based systems, digital storage based systems are commonly referred to as "non-linear". Common to most editing systems is a convention of video material coming from a "source" and going to a "recorder". While this approach originated in linear tape-based editing, it is still the norm for non-linear video editing systems.

Industry conventions have for many years placed source VCR selection on the "home row" of the QWERTY keyboard, i.e., the row comprising the characters "A", "S", "D", "F", "G", "H", "J", "K", "L" and ";". This convention has been used by editing systems from Ampex, ASC, Calaway, CMX, Grass Valley Group, Matrox, Sony, Strassner and others. The result of source VCR selection by a home-row key is simply an assignment of an editing system's machine control to a given VCR and an associated execution of a video switchpoint which displays video on a source or preview monitor. To perform the corresponding function in digital non-linear editing systems, editors have been required to take their eyes off their material, move a mouse to a thumbnail image representing a clip and execute source footage selection—usually by either double clicking on a mouse or dragging the material to the source side of an edit screen.

There is a perceived need in non-linear video editing systems to provide the editor with an improved method for accessing a desired video clip and thereby better utilize the capabilities of a digital storage-based system.

SUMMARY OF THE INVENTION

The present invention directly maps home row keys to video clips which have been logged, digitized, or imported into the editing system's database. This direct mapping of video clips to keys is distinctly different than the mapping of source VCR's to keys, in that all associated database records for a given clip, including provisional edit points, are instantly available. It also results in instant access to each clip without an editor having to take his/her eyes off the material being edited, which is a major advantage in editing where creative concentration is critical to story composition and productivity. This new process of the current invention is substantially faster for an editor than manual movement of a mouse, or other means provided by other systems, and represents a significant operational improvement in the state of the art of video editing.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
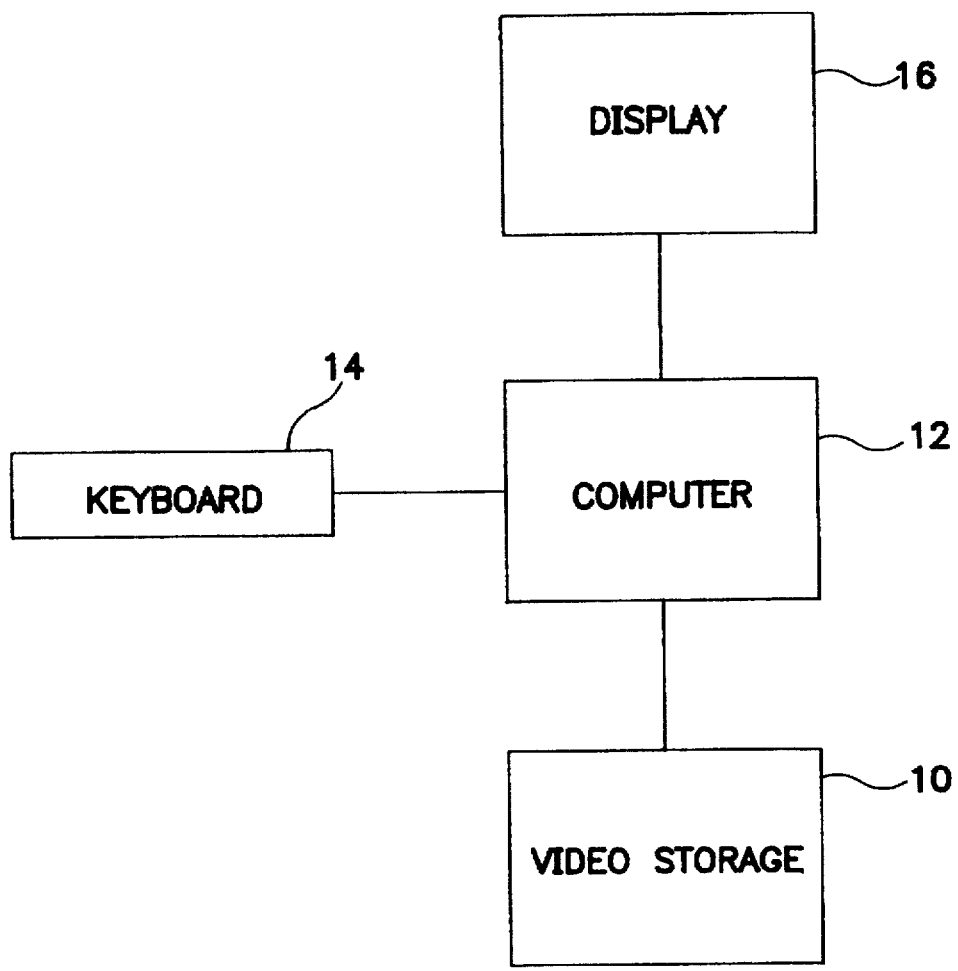
FIG. 1 is a simplified block diagram of a non-linear video editing system.

FIG. 1 illustrates, in simplified fashion, a typical video editing system to which the present invention is applicable. Digitally compressed video data comprising source material for use in the editing process is stored in video storage unit 10.

Overall operation of the video editing system is controlled by computer 12, which retrieves, stores and formats data stored in unit 10. The editor is provided a keyboard to control the various editing functions. Source material and edited material are displayed on one or more display units 16. A non-linear editing system embodying the present invention is the ASC VR® NLE Editor manufactured by ASC Audio Video Corporation, the assignee of this application.

Figure 2:
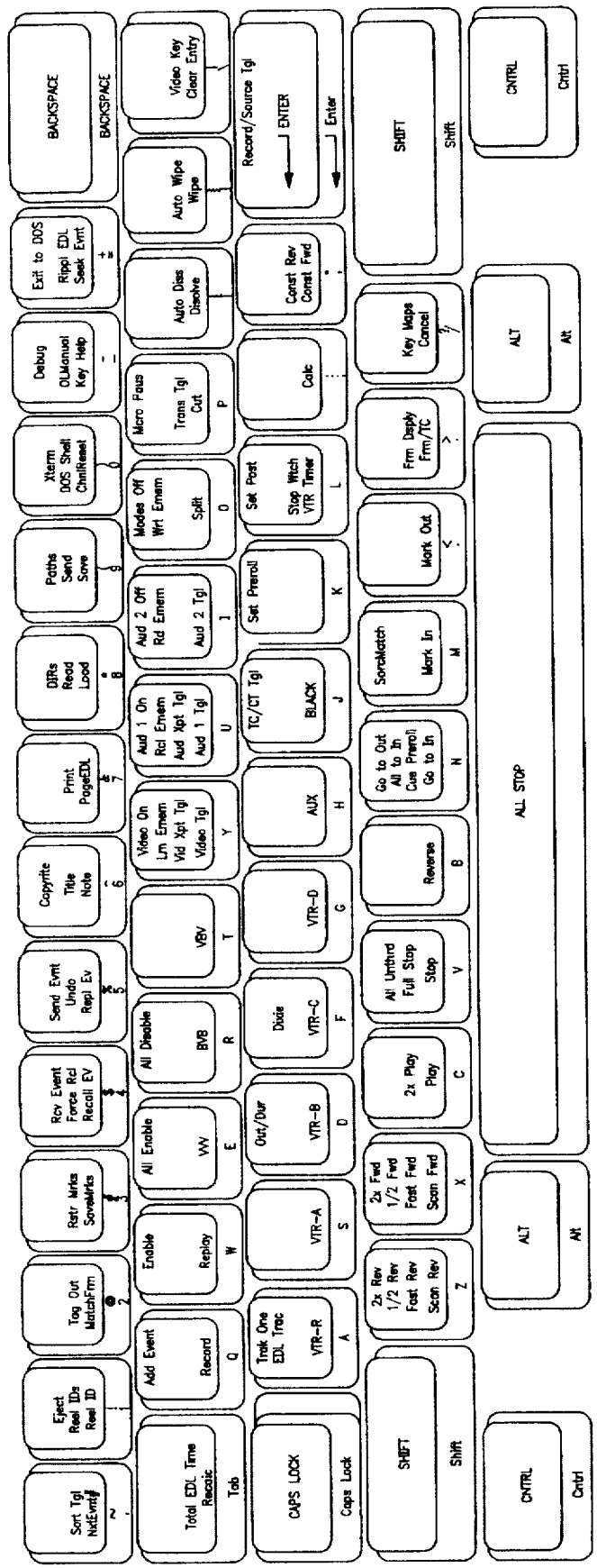
FIG. 2 is a partial view of a QWERTY keyboard used in a prior art video editing system.

FIG. 2 illustrates a typical prior art video editing keyboard. Although arranged in a conventional QWERTY layout, the keys are uniquely assigned to various 20 video editing functions. The key assignments have, in large part, become industry conventions. On the illustrated keyboard, it will be observed that the "A", "S", "D", "F" and "G" keys are employed to designate respective video tape recorders (VTR's).

Figure 3:
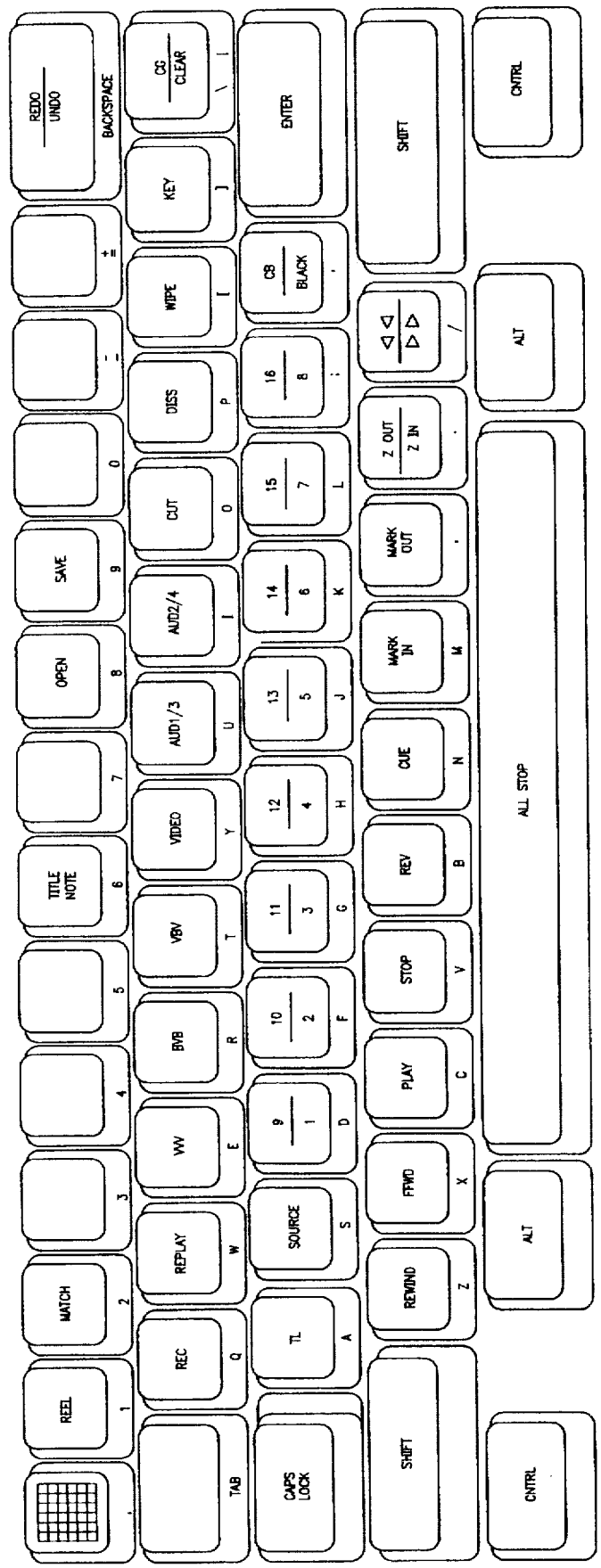
FIG. 3 is a partial view of a QWERTY keyboard in accordance with the present invention.

Referring now to FIG. 3, a keyboard for an improved video editing system in accordance with the present invention is illustrated. Eight of the home row keys, namely, "D", "F", "G", "H", "J", "K", "L" and ";"are assigned to respective pairs of video clips, each of which has a numeric designation. For example, the "D" key is employed to designate video clip 1 or, if the shift key is also actuated, to designate video clip 9. Likewise, the "F" key is used to designate video clip 2 or 10, etc. By operation of these keys, digital video source material may be immediately brought to the source side of an edit screen where video and audio material will be evaluated for inclusion in an edit.

Up to sixteen video clips may be brought into a pre-cue buffer status by selection into an editing screen labeled "Selected Clips". These represent the "most relevant clips" for a given edit or series of edits. The system allows these "most relevant clips" to be selected by database sorting or by manual execution. Each clip of these 16 is now directly accessible by one keystroke, and they are immediately visible in a 16-shot visual full-screen grid to allow easy identification and selection.

Further, the application of this buffer status allows these clips may be placed into a "Master/Slave" relationship, allowing assignment of one clip to be the reference "Master" and all other 15 of the 16 clips to be "Slaves". The movement of up to 15 clips is made to mimic the movement of the original "Master" clip.

Selection and specification of the "Master" clip is directly mapped to the QWERTY keyboard using the present invention. By, for example, selecting clip number six on the home row of keys, this clip is assigned "Master" status for all other clips to follow, whenever the Master/Slave mode is engaged. This procedure is considered to be a major improvement in operational speed when compared to any other system.

Where there are more than 16 clips under consideration for a given edit, the "clip number" assigned by the system can also be used to select material into the edit source window, and, onto the top of the list of those clips being considered for a given edit. Selection of these clips into the 16-shot "most relevant clips" screen is accomplished by simple numerical identification of the clip desired. Such selection of "most relevant clips" may also be accomplished by using a database search.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of sourcing a video clip in a video editing system having a storage device for storing a plurality of randomly accessible video clips, a display screen and a keyboard, said method comprising the steps of:

designating a set of most relevant clips from among the plurality of randomly accessible video clips;

displaying at least one identifying image of each member of the set of most relevant clips on the display screen;

assigning each member of the set of most relevant clips to a respective predetermined key on the keyboard;

depressing the predetermined key corresponding to a desired member of the set of most relevant clips;

providing the desired member as the source clip to the video editing system.

2. The method of claim 1 further comprising the steps of:

selecting the desired member of the set of most relevant clips as a master;

advancing each member of the set of most relevant clips other than the desired member in synchronism with advancement of the desired member.

3. A video editing keyboard comprising a set of alphanumeric keys in a QWERTY layout, at least some of said keys including numeric indicia in addition to QWERTY indicia, said numeric indicia uniquely corresponding to members of a set of preselected video clips, wherein said QWERTY layout includes a home row of keys comprising the characters "A", "S", "D", "F", "G", "H", "J", "K", "L", ";" and wherein said keys including numeric indicia are all located on the home row.

4. The video editing keyboard of claim 3 wherein the "D" key includes numeric indicia "1" and "9";

the "F" key includes numeric indicia "2" and "10";

the "G" key includes numeric indicia "3" and "11";

the "H" key includes numeric indicia "4" and "12";

the "J" key includes numeric indicia "5" and "13";

the "K" key includes numeric indicia "6" and "14";

the "L" key includes numeric indicia "7" and "15"; and the ";" key includes numeric indicia "8" and "16".

* * * * *

UNITED STATES PATENT AND TRADEMARK OFFICE
CERTIFICATE OF CORRECTION

PATENT NO. : 5,748,253
DATED : May 5, 1998
INVENTOR(S) : Chatinsky et al.

It is certified that error appears in the above-identified patent and that said Letters Patent is hereby corrected as shown below:

In column 1, at line 10, please delete "significant improves" and insert --significantly improves--.
On the title page, Item [57],
In the abstract, at line 2, please delete "nonlinear" and insert --non-linear--.

Signed and Sealed this

Sixth Day of July, 1999

Attest:

Q. TODD DICKINSON

*Attesting Officer*     *Acting Commissioner of Patents and Trademarks*